United States Patent
Namikawa (10) Patent No.: US 12,326,426 B2
(45) Date of Patent: Jun. 10, 2025

(54) MANAGEMENT SYSTEM FOR MANAGING OPERATION OF PREPARATIVE LIQUID CHROMATOGRAPH APPARATUS

(71) Applicant: SHIMADZU CORPORATION, Kyoto (JP)

(72) Inventor: Minoru Namikawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 404 days.

(21) Appl. No.: 18/099,640

(22) Filed: Jan. 20, 2023

(65) Prior Publication Data
US 2023/0288385 A1 Sep. 14, 2023

(30) Foreign Application Priority Data
Mar. 8, 2022 (JP) ................... 2022-035069

(51) Int. Cl.
*G01N 30/86* (2006.01)
*B01D 15/14* (2006.01)
(Continued)

(52) U.S. Cl.
CPC ......... *G01N 30/8624* (2013.01); *B01D 15/14* (2013.01); *G01N 30/14* (2013.01);
(Continued)

(58) Field of Classification Search
CPC .. G01N 30/06; G01N 2030/027; G01N 30/08; G01N 30/80; G01N 30/82;
(Continued)

(56) References Cited

U.S. PATENT DOCUMENTS

2019/0391117 A1* 12/2019 Yamazaki ............... G01N 30/84
2021/0310997 A1* 10/2021 Yamazaki ............... G01N 30/06

FOREIGN PATENT DOCUMENTS

JP  2021-162550 A  10/2021

* cited by examiner

*Primary Examiner* — Kristina M Deherrera
*Assistant Examiner* — Gedeon M Kidanu
(74) *Attorney, Agent, or Firm* — Renner, Otto, Boisselle & Sklar, LLP (57) ABSTRACT

A management system (1) for managing an operation of a preparative LC (100), the management system (1) including an injection registration part (2) configured to display an injection registration screen in response to a request from the user and register a container designated by the user on the injection registration screen as an injection target container, a result display part (6) configured to display a chromatogram created based on an output signal of a detector (108) of the preparative LC, create fractionation information indicating a correspondence relationship between a position on the chromatogram of each fraction collected in an individual container by a fractionator (112) of the preparative LC and a position of a container in which each fraction is collected, and display the created fractionation information as a fractionation result screen, a reinjection registration part (8) configured to allow the user to designate a fraction to be reinjected on the fractionation result screen, and configured to register a container in which the fraction designated by the user is collected as a reinjection target container when the fraction to be reinjected is designated by the user, and a controller (4) that controls operation of an injector of the preparative LC so that liquid contained in the container registered as the injection target container or the reinjection target container is injected.

3 Claims, 6 Drawing Sheets

(51) Int. Cl.
  *G01N 30/02* (2006.01)
  *G01N 30/14* (2006.01)
  *G01N 30/24* (2006.01)
  *G01N 30/32* (2006.01)

(52) U.S. Cl.
  CPC ............ *G01N 30/24* (2013.01); *G01N 30/32* (2013.01); *G01N 2030/027* (2013.01); *G01N 2030/326* (2013.01)

(58) Field of Classification Search
  CPC ............ G01N 30/84; G01N 2030/062; G01N 2030/065; G01N 2030/146; G01N 2030/201; G01N 2030/202; G01N 2030/324; G01N 2030/8411; G01N 30/04; G01N 30/26; G01N 30/32; G01N 30/34; G01N 30/44; G01N 30/46; G01N 30/463; G01N 30/466; G01N 30/62; G01N 30/8665; G01N 30/88; G01N 35/1065; G01N 2030/326; G01N 2030/8804; G01N 30/14; G01N 30/24; G01N 30/8624; G01N 35/106; B01D 15/22; B01D 15/20; B01D 15/24; B01D 15/247; B01D 15/424; B01D 15/14
  See application file for complete search history.

| INJECTION REGISTRATION | | | | | |
|---|---|---|---|---|---|
| PLATE No. | VIAL No. | METHOD | NAME | INJECTION AMOUNT | |
| | | | | | |
| | | | | | |
| | | | | | |
| | | | | | |
| | | | | | |

CANCEL  OK

MANAGEMENT SYSTEM FOR MANAGING OPERATION OF PREPARATIVE LIQUID CHROMATOGRAPH APPARATUS

BACKGROUND OF THE INVENTION

1. Field of the Invention

The present invention relates to a management system for managing operation of a preparative liquid chromatograph apparatus (hereinafter, preparative LC).

2. Description of the Related Art

The preparative LC is a device in which a sample is injected into a mobile phase and introduced into a separation column, a plurality of components contained in the sample are separated from each other by the separation column, and then a desired portion of an eluate from the separation column is collected in a container as a fraction so that each separated component is collected in an individual container.

Some preparative LCs include a liquid handler having both a function as an injector for injecting a sample into a mobile phase and a function as a fraction collector for collecting a desired portion of an eluate from a separation column in a container as a fraction (see JP 2021-162550A). The preparative LC including a liquid handler can perform qualitative analysis for reinjecting a fraction collected in a container into a mobile phase and checking whether the fraction contains a target component, whether the fraction does not contain a component other than a target component, and the like.

SUMMARY OF THE INVENTION

When performing fractionation of a sample by the preparative liquid chromatograph apparatus as described above, the user needs to open an injection registration screen on software for managing operation of the preparative LC and register a container containing a sample to be injected from among a plurality of containers set in a liquid handler as an injection target container. The same applies to a case of performing reinjection of a fraction collected in a container, and the user has needed to check which container contains a fraction to be reinjected with reference to a chromatogram displayed on a fractionation result screen and a position of a container where the fraction is collected, and then open the injection registration screen to register the container containing the fraction to be reinjected as the injection target container. However, such registration operation is complicated, and a setting error is likely to occur.

The present invention has been made in view of the above problem, and an object of the present invention is to facilitate setting of reinjection of a fraction collected in a container.

A management system according to the present invention is a management system for managing operation of a preparative liquid chromatograph apparatus. The preparative liquid chromatograph apparatus includes a liquid delivery pump for feeding a mobile phase, an injector configured to collect liquid from an optional container among a plurality of containers arranged at a predetermined position and to inject the liquid into the mobile phase, a separation column for separating components in the liquid injected into the mobile phase by the injector from each other, a detector that outputs a signal according to a component concentration in an eluate from the separation column, and a fractionator for collecting each of desired portions of the eluate from the separation column into an individual container as a fraction downstream of the detector using a plurality of the containers. The management system includes an injection registration part configured to display an injection registration screen in response to a request from a user, and to register a container designated by the user on the injection registration screen as an injection target container, a result display part configured to display a chromatogram created based on the signal output by the detector, to create fractionation information indicating a correspondence relationship between a position on the chromatogram of each fraction collected in an individual container by the fractionator and a position of a container in which each fraction is collected, and to display the created fractionation information as a fractionation result screen, a reinjection registration part configured to allow the user to designate a fraction to be reinjected on the fractionation result screen, and to register a container in which the fraction designated by the user is collected as a reinjection target container when the fraction to be reinjected is designated by the user, and a controller configured to control operation of the injector so that liquid contained in the container registered as the injection target container or the reinjection target container is injected into the mobile phase.

According to the management system of the present invention, since a reinjection target container can be registered on a fractionation result screen without opening an injection registration screen, it is possible to easily set reinjection of a fraction collected in a container.

DETAILED DESCRIPTION OF THE INVENTION

Hereinafter, an embodiment of a management system according to the present invention will be described with reference to the drawings.

Figure 1:
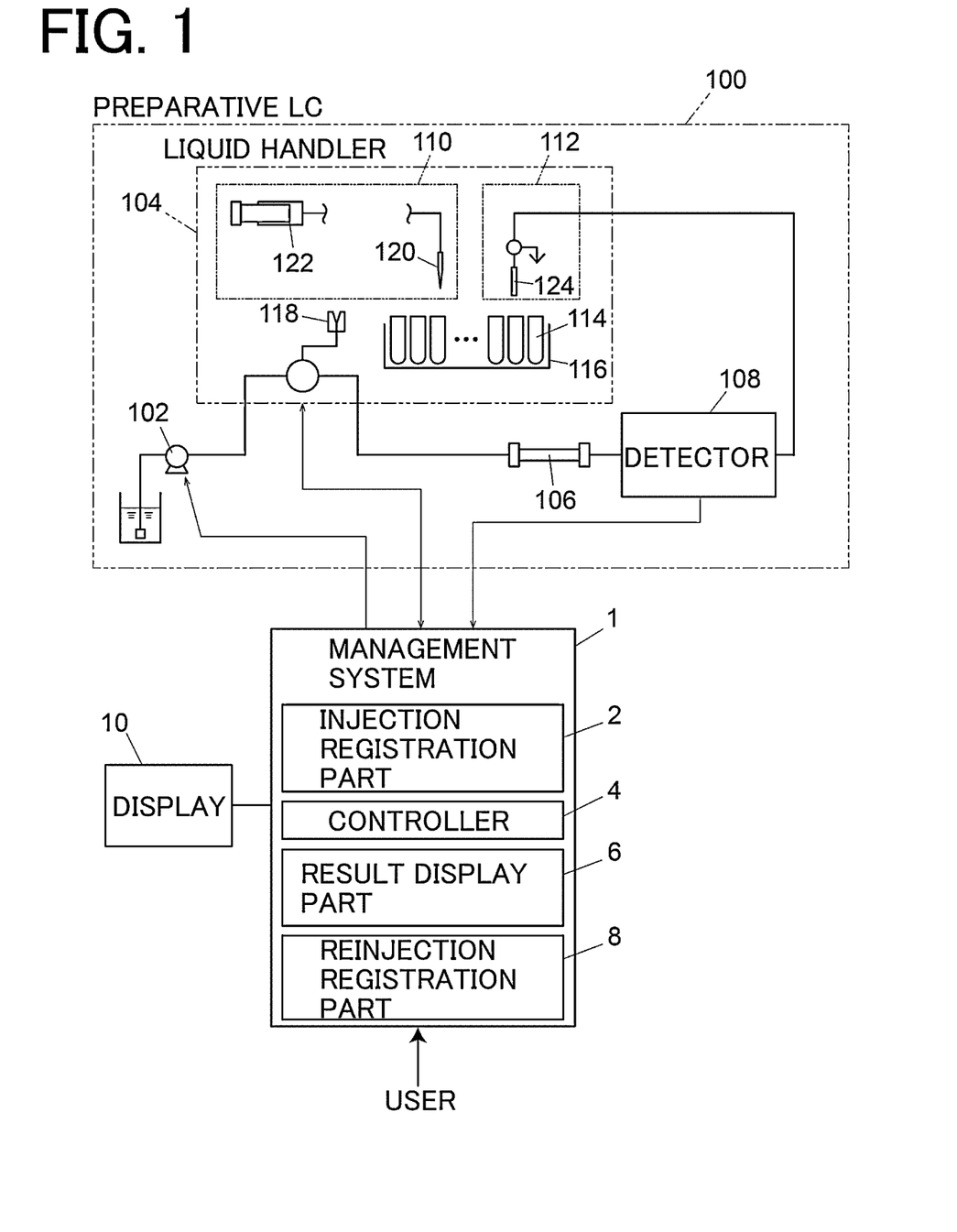
FIG. 1 is a diagram illustrating an embodiment of a management system of a preparative LC together with a fractionation system.

A management system 1 is provided to be able to communicate with a preparative LC 100 and is a system for managing operation of the preparative LC 100. The management system 1 is realized by installing management software for the preparative LC 100 in a computer device (for example, a personal computer) including a central processing unit (CPU) and an information storage device. The management system 1 implemented in this manner is equipped with functions such as an injection registration part 2, a controller 4, a result display part 6, and a reinjection registration part 8. Each function will be described later. Further, a display 10 for displaying various types of information is electrically connected to the management system 1.

The preparative LC 100 includes a liquid delivery pump 102, a liquid handler 104, a separation column 106, and a detector 108. The liquid delivery pump 102 is for feeding a mobile phase toward the separation column 106. The liquid handler 104 has a function as an injector that injects a sample into a mobile phase fed by the liquid delivery pump 102 and a function as a fraction collector that collects a desired portion of an eluate from the separation column 106 in an individual container as a fraction. The separation column 106 is for separating components contained in a sample injected into a mobile phase by the liquid handler 104 from each other. The detector 108 outputs a signal corresponding to concentration of a component contained in an eluate from the separation column 106. Note that, although only one of the detector 108 is illustrated as a detector in the preparative LC 100 of the present embodiment, two or more of the detectors may be provided.

The liquid handler 104 includes an injector 110 that realizes a function as an injector and a fractionator 112 that realizes a function as a fraction collector. Further, a plurality of containers 114 are set at predetermined positions in the liquid handler 104 in a state of being placed on a plate 116. A plurality of the containers 114 set in the liquid handler 104 include a container (also referred to as collection container) for collecting a part of an eluate from the separation column 106 as a fraction, in addition to a container (also referred to as sample container) for storing a sample. Note that, in a diagram, all of a plurality of the containers 114 are illustrated as being mounted on the common plate 116, but the sample container and the collection container may be mounted on different plates.

The injector 110 of the liquid handler 104 includes a needle 120 for sampling that operates three-dimensionally, and a syringe pump 122 for sucking and discharging liquid through the needle 120. The needle 120 can have access to all of a plurality of the containers 114 set at a predetermined position, and allows collection of liquid from a desired one of the containers 114 and injection of the liquid into a mobile phase via an injection port 118.

The fractionator 112 of the liquid handler 104 includes a nozzle 124 to which a flow path on the outlet side of the detector 108 is connected. The nozzle 124 operates three-dimensionally, and can drop an eluate from the separation column 106 to the collection container 114 mounted on the plate 116. That is, the fractionator 112 can collect a desired portion of an eluate from the separation column 106 as a fraction in an individual one of the collection containers 114.

The management system 1 controls operation of the liquid delivery pump 102 and the liquid handler 104. Information such as what kind of a sample is contained in which of the containers 114 on the plate 116 of the liquid handler 104 is registered in the management system 1 by the user. The management system 1 can recognize a state of each of the containers 114 in the liquid handler 104 based on the information registered by the user, and indicate a state of each of the containers 114 to the user through the display 10.

In order to fractionate a target component by injecting a sample set in the liquid handler 104, it is necessary for the user to register a container containing a sample to be injected as an injection target container in the management system 1.

The injection registration part 2 is a function for the user to register an injection target container in the management system 1.

Figure 2:
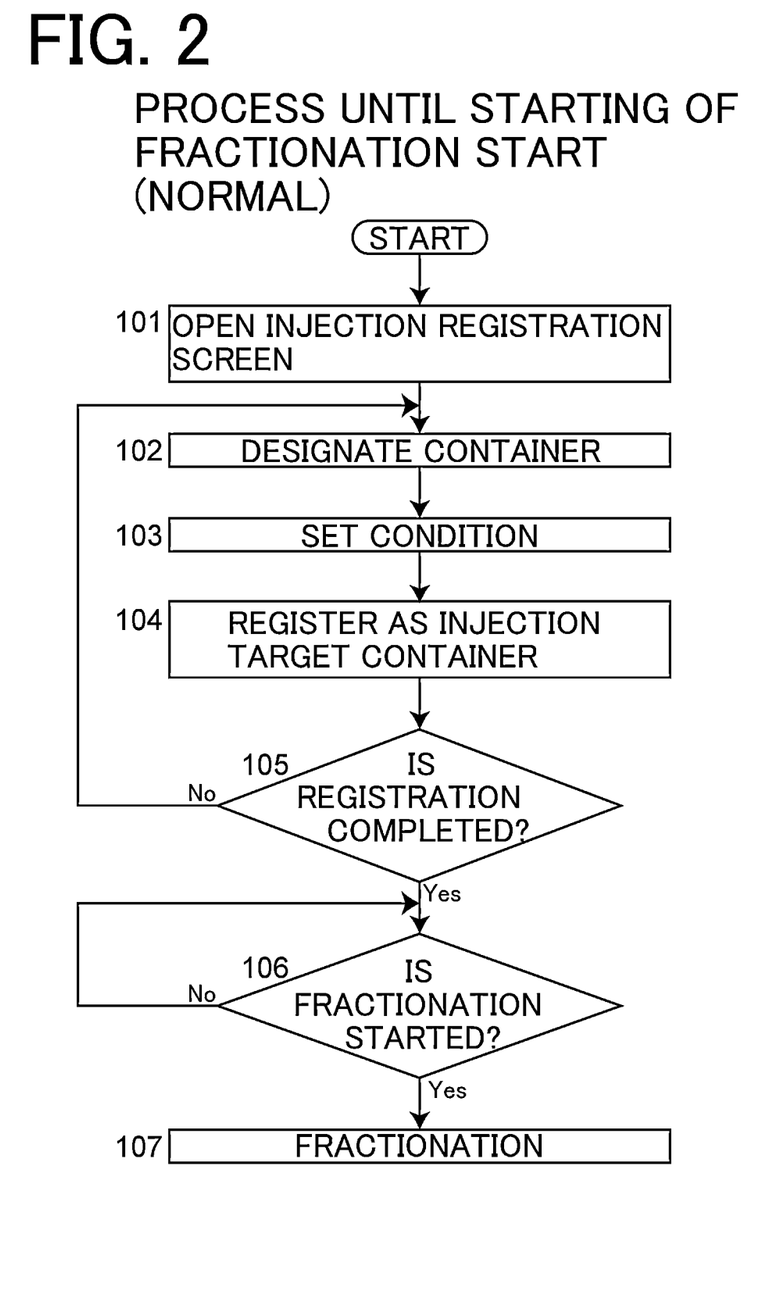
FIG. 2 is a flowchart showing an example of a process until fractionation of a sample is executed in the embodiment.

An example of a process from registration of an injection target container to start of fractionation will be described with reference to FIG. 1 and a flowchart of FIG. 2.

Figure 4:
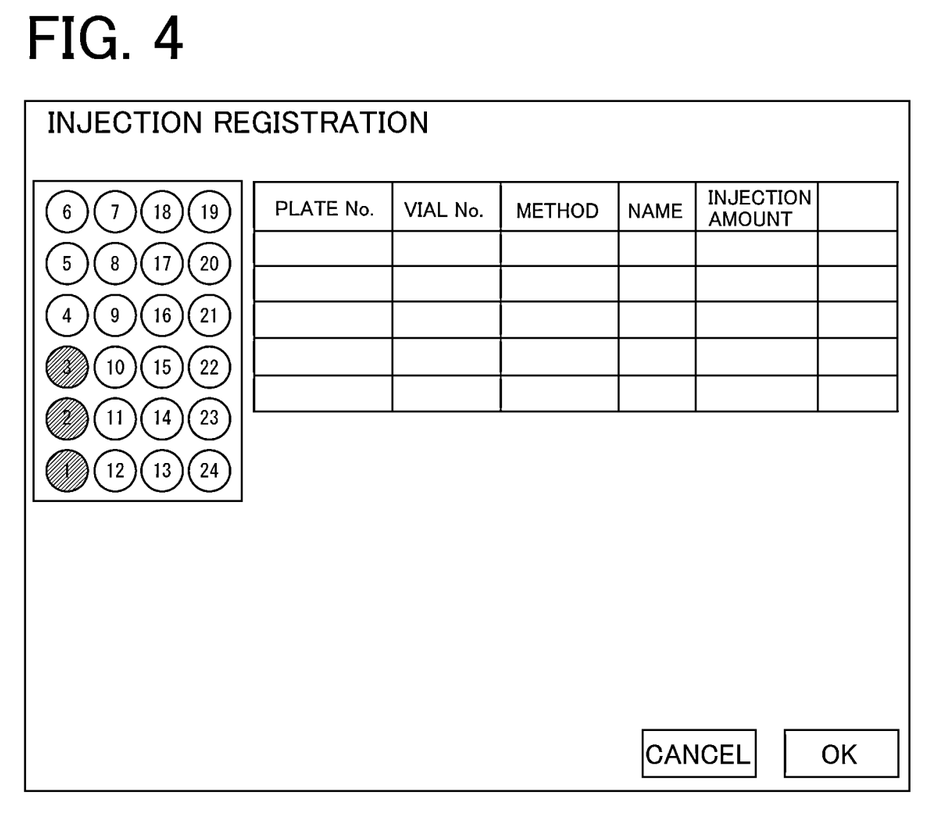
FIG. 4 is an example of an injection registration screen.

When the user inputs an injection registration instruction to the management system 1, the injection registration part 2 opens an injection registration screen as illustrated in FIG. 4 on the display 10 (Step 101). At this time, the injection registration screen shows in which container of a plurality of the containers 114 a sample is contained together with an arrangement image of a plurality of the containers 114 in the plate 116. In the example of FIG. 4, a container containing a sample is indicated by hatching. The user designates a desired one of the containers 114 indicated on the injection registration screen (Step 102), and sets a fractionation condition (for example, an injection amount, a method to be used, and the like) for a sample in the container (Step 103). When the user designates the container 114 containing a sample to be injected and sets a fractionation condition of the sample, the injection registration part 2 registers the container as an injection target container (Step 104). At this time, the injection registration part 2 can display a list of registered injection target containers in an injection registration screen as an injection list. In FIG. 4, a table displayed on the right side of the arrangement image of the containers corresponds to the injection list.

In a case where there is another sample to be injected, Steps 102 to 104 described above are repeated (Step 105: No). Then, when the user inputs completion of the injection registration to the management system 1 (in the example of FIG. 4, the user left-clicks an "OK" button), the injection registration part 2 completes the injection registration (Step 105: Yes). After the above, when the user inputs an instruction to start fractionation (Step 106: Yes), the controller 4 controls operation of the preparative LC 100 so that fractionation of a sample in a container registered as an injection target container is executed under a set condition (Step 107).

When fractionation of the sample is completed, the result display part 6 of the management system 1 displays a fractionation result screen on the display 10. The fractionation result screen is for indicating fractionation information such as which part of a chromatogram created based on a signal output from the detector 108 during fractionation is collected as a fraction in the container 114, and further, which of the containers 114 each of fraction portions on the chromatogram is collected. That is, on the fractionation result screen, a correspondence relationship between a position on a chromatogram of a fraction collected in the container 114 and a position of the container 114 where the fraction is collected is shown as the fractionation information.

In a case where it is desired to perform qualitative analysis or the like by reinjecting a fraction collected in the container 114, the user can register a reinjection target container on the above-described fractionation result screen. The reinjection registration part 8 of the management system 1 is a function for the user to register a reinjection target container on the fractionation result screen.

Figure 3:
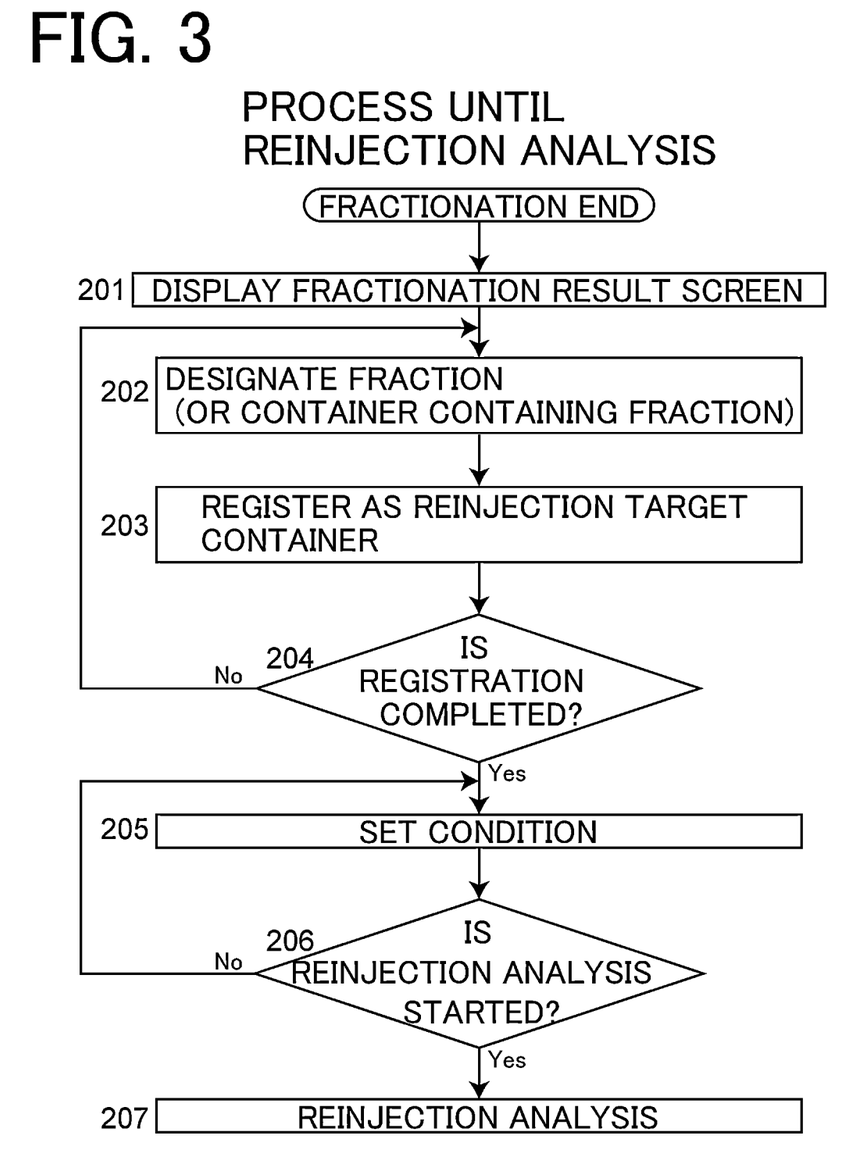
FIG. 3 is a flowchart showing an example of a process until reinjection analysis of a fraction is performed in the embodiment.

A process from the end of fractionation of a sample to the execution of the reinjection analysis of a fraction will be described with reference to FIG. 1 and a flowchart of FIG. 3.

Figure 5:
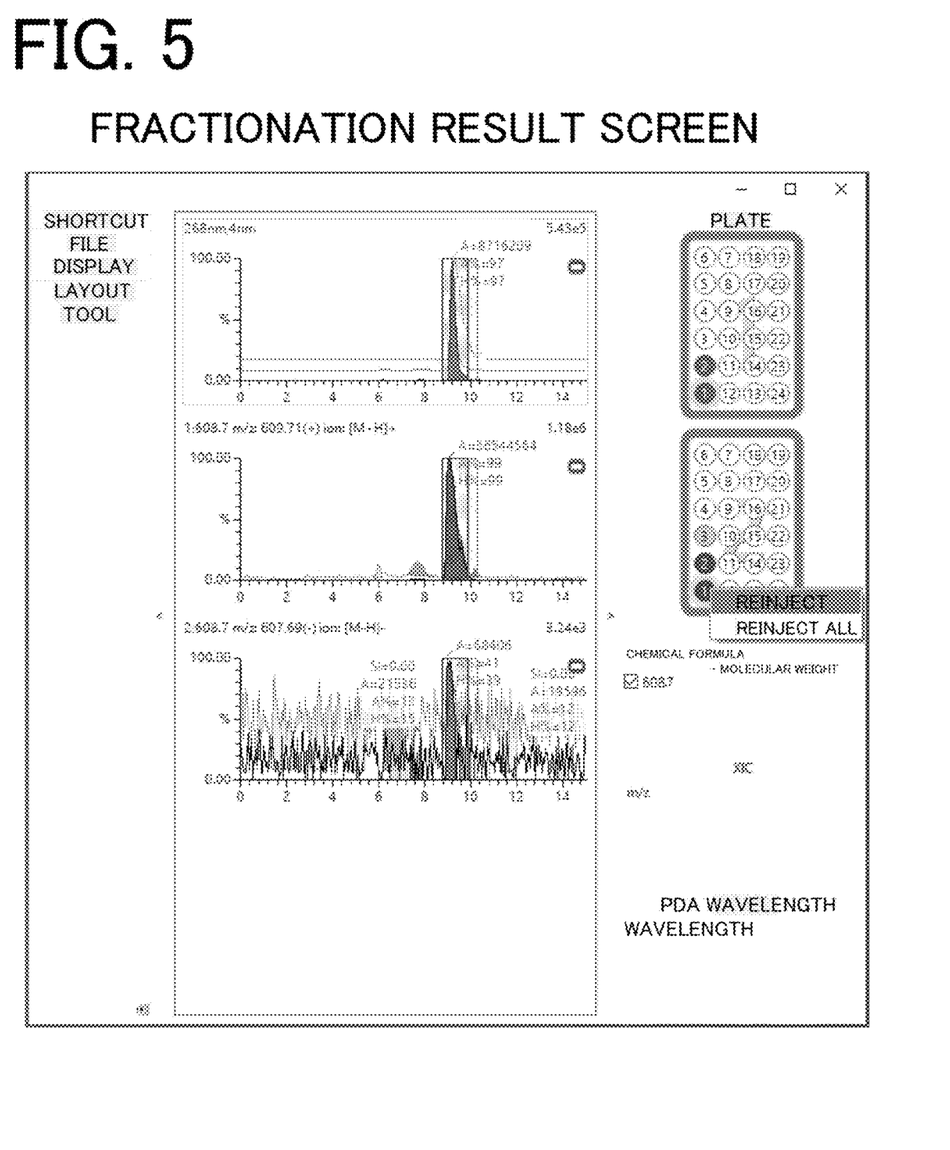
FIG. 5 is an example of display on a fractionation result screen when a reinjection target container is registered by designating a number of a container containing a fraction to be reinjected on the fractionation result screen.
Figure 6:
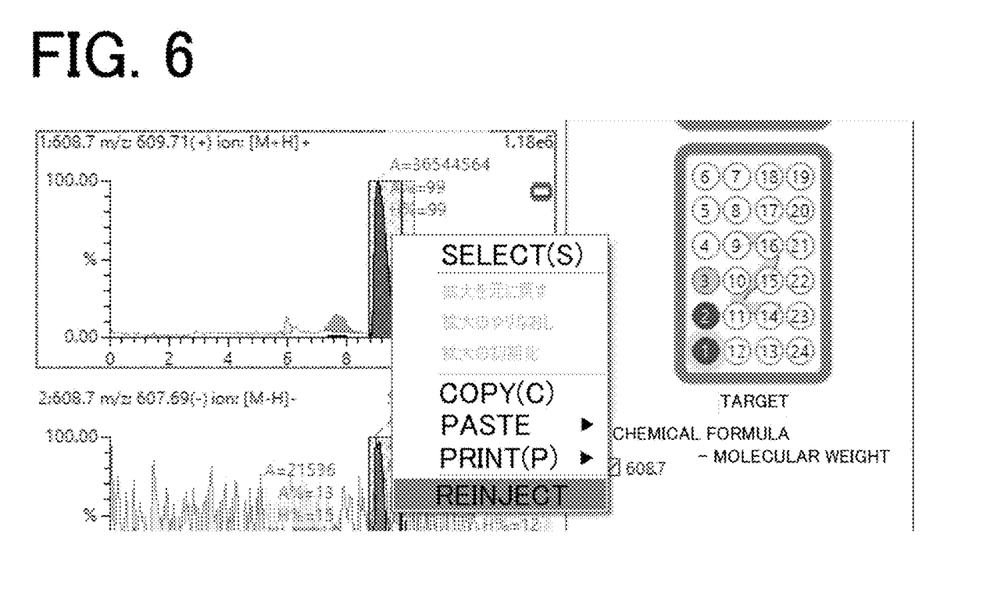
FIG. 6 is an example of display on a fractionation result screen when a reinjection target container is registered by designating a fraction to be reinjected on a chromatogram on the fractionation result screen.

As described above, when fractionation of a sample ends, the fractionation result screen is displayed on the display 10 by the result display part 6 (Step 201). FIG. 5 is an example of the fractionation result screen. The user can designate a desired fraction on such a fractionation result screen (Step 202). Designation of a fraction can be performed by designating a number of a container containing a fraction to be reinjected as in the example of FIG. 5. In the example of FIG. 5, when an optional container in the container arrangement image on the right side is left-clicked, it is indicated which part on a chromatogram a fraction collected in the container corresponds to. Therefore, it is easy for the user to identify a container containing a fraction to be reinjected. Then, when the user right-clicks the container containing the fraction to be reinjected, the user can select an instruction to set a target of reinjection, and in this manner, the user can designate a desired fraction as a reinjection target. Further, as in an example of FIG. 6, the user can also directly designate a fraction as a fraction to be reinjected on a chromatogram displayed on the fractionation result screen. In the example of FIG. 6, in a case where a fraction to be reinjected is designated on a chromatogram, a desired portion on the chromatogram is right-clicked, and an instruction to set a target of reinjection is selected.

When the user designates a fraction to be reinjected as described above, the reinjection registration part 8 registers the container 114 containing the designated fraction as a reinjection target container (Steps 203 and 204). In a case where there are a plurality of fractions to be reinjected, the user designates a plurality of fractions, so that each of the containers 114 containing the fractions is registered as a container to be reinjected by the reinjection registration part 8. When the registration of a reinjection target container is completed (Step 204: Yes), a screen for setting an analysis condition (injection amount, method to be used, and the like) for each designated fraction is opened (Step 205). When the user sets an analysis condition and inputs an instruction to start reinjection analysis (Step 206: Yes), the controller 4 controls operation of the preparative LC 100 so that the reinjection analysis of a fraction in the container registered as the reinjection target container is executed under the set condition (Step 207).

Note that setting of the reinjection analysis of a fraction collected in the container 114 can also be performed using a function of the injection registration part 2. That is, after fractionation of a sample ends, the injection registration screen is opened, the container 114 containing a fraction to be subjected to the reinjection analysis is designated on the injection registration screen, and registered as an injection target container, so that the reinjection analysis of a fraction can be executed. However, in such a setting method, it is necessary to check that a fraction for which the reinjection analysis is to be performed is collected in a container at which position on the fractionation result screen, and to open the injection registration screen separately from the analysis result screen to perform registration operation of an injection target container, and a setting error of the reinjection analysis is likely to occur. On the other hand, in the present embodiment, since the management system 1 is equipped with the reinjection registration part 8, it is possible to set the reinjection analysis of a fraction on the analysis result screen without opening the injection registration screen, a workload of setting the reinjection analysis is reduced, and a setting error of the reinjection analysis is less likely to occur.

Note that the above embodiment is merely an example of an embodiment of the management system according to the present invention. The embodiment of the management system according to the present invention is as described below.

An embodiment of the management system according to the present invention is a management system for managing operation of a preparative liquid chromatograph apparatus. The preparative liquid chromatograph apparatus includes a liquid delivery pump for feeding a mobile phase, an injector configured to collect liquid from an optional container among a plurality of containers arranged at a predetermined position and to inject the liquid into the mobile phase, a separation column for separating components in the liquid injected into the mobile phase by the injector from each other, a detector that outputs a signal according to a component concentration in an eluate from the separation column, and a fractionator for collecting each of desired portions of the eluate from the separation column into an individual container as a fraction downstream of the detector using a plurality of the containers.

The management system includes:
 an injection registration part configured to display an injection registration screen in response to a request from a user, and to register a container designated by the user on the injection registration screen as an injection target container;
 a result display part configured to display a chromatogram created based on the signal output by the detector, to create fractionation information indicating a correspondence relationship between a position on the chromatogram of each fraction collected in an individual container by the fractionator and a position of a container in which each fraction is collected, and to display the created fractionation information as a fractionation result screen;
 a reinjection registration part configured to allow the user to designate a fraction to be reinjected on the fractionation result screen, and to register a container in which the fraction designated by the user is collected as a reinjection target container when the fraction to be reinjected is designated by the user; and
 a controller configured to control operation of the injector so that liquid contained in the container registered as the injection target container or the reinjection target container is injected into the mobile phase.

In a first aspect of the embodiment, the reinjection registration part is configured to allow designation of the fraction to be reinjected to be performed by designation of a position on the chromatogram displayed on the fractionation result screen. According to such an aspect, since the user can directly designate the fraction to be reinjected on the chromatogram, a workload for registering the reinjection target container is further reduced.

In a second aspect of the embodiment, the reinjection registration part is configured to allow designation of the fraction to be reinjected to be performed by designation of a number allocated to each of a plurality of the containers on the fractionation result screen.

DESCRIPTION OF REFERENCE SIGNS

1: management system
2: injection registration part
4: controller
6: result display part
8: reinjection registration part
10: display

What is claimed is:

1. A management system for managing operation of a preparative liquid chromatograph apparatus, wherein
 the preparative liquid chromatograph apparatus includes:

a liquid delivery pump for feeding a mobile phase;
an injector configured to collect liquid from an optional container among a plurality of containers arranged at a predetermined position and to inject the liquid into the mobile phase;
a separation column for separating components in the liquid injected into the mobile phase by the injector from each other;
a detector that outputs a signal according to a component concentration in an eluate from the separation column; and
a fractionator for collecting each of desired portions of the eluate from the separation column into an individual container as a fraction downstream of the detector using the plurality of containers,
the management system comprises:
an injection registration part configured to display an injection registration screen in response to a request from a user, and to register a container designated by the user on the injection registration screen as an injection target container;
a result display part configured to display a chromatogram created based on the signal output by the detector, to create fractionation information indicating a correspondence relationship between a position on the chromatogram of each fraction collected in an individual container by the fractionator and a position of a container in which each fraction is collected, and to display the created fractionation information as a fractionation result screen;
a reinjection registration part configured to allow the user to designate a fraction to be reinjected on the fractionation result screen, and to register a container in which the fraction designated by the user is collected as a reinjection target container when the fraction to be reinjected is designated by the user; and
a controller configured to control operation of the injector so that liquid contained in the container registered as the injection target container or the reinjection target container is injected into the mobile phase.

2. The management system according to claim 1, wherein the reinjection registration part is configured to allow designation of the fraction to be reinjected to be performed by designation of a position on the chromatogram displayed on the fractionation result screen.

3. The management system according to claim 1, wherein the reinjection registration part is configured to allow designation of the fraction to be reinjected to be performed by designation of a number allocated to each of the plurality of containers on the fractionation result screen.

* * * * *